(12) United States Patent
Jonouchi et al.

(10) Patent No.: US 12,071,878 B2
(45) Date of Patent: Aug. 27, 2024

(54) PARTICLE DEPOSITION AMOUNT ESTIMATION DEVICE AND EXHAUST PURIFICATION SYSTEM

(71) Applicant: Yanmar Holdings Co., Ltd., Osaka (JP)

(72) Inventors: Katsunari Jonouchi, Osaka (JP); Masahiro Itani, Osaka (JP); Keiji Kunisawa, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/119,124

(22) Filed: Mar. 8, 2023

(65) Prior Publication Data

US 2023/0287824 A1    Sep. 14, 2023

(30) Foreign Application Priority Data

Mar. 10, 2022 (JP) .................... 2022-037111

(51) Int. Cl.
*F01N 11/00* (2006.01)
*B01D 53/94* (2006.01)
(Continued)

(52) U.S. Cl.
CPC .......... *F01N 11/005* (2013.01); *B01D 53/944* (2013.01); *B01D 53/9477* (2013.01); *B01D 53/9495* (2013.01); *F01N 3/023* (2013.01); *F01N 3/037* (2013.01); *F01N 3/106* (2013.01); *F02D 41/029* (2013.01); *F02D 41/22* (2013.01); *B01D 2258/012* (2013.01); *F01N 3/0232* (2013.01); *F01N 3/025* (2013.01); *F01N 3/0253* (2013.01); *F01N 9/002* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,284,870 B2 * | 3/2016 | Gonze | ..................... F01N 3/027 |
| 2006/0179826 A1 * | 8/2006 | Kuboshima | ........... F01N 11/002 60/288 |

(Continued)

FOREIGN PATENT DOCUMENTS

JP    2017057830 A    3/2017

*Primary Examiner* — Binh Q Tran
(74) *Attorney, Agent, or Firm* — NORTON ROSE FULBRIGHT US LLP (57) ABSTRACT

A control device is configured to estimate a soot deposition amount (PM deposition amount) in a DPF for an exhaust purification device that is configured to purify exhaust of a diesel engine using the DPF, and determine a regeneration timing for the diesel engine based on the estimated PM deposition amount. As a technique of determining the regeneration timing, the control device employs a first determination technique of detecting that the PM deposition amount is a first threshold or more and a state in which the PM deposition amount is the first threshold or more has continued for a first predetermined time and a second determination technique of detecting that the PM deposition amount is a second threshold (>the first threshold) or more and a state in which the PM deposition amount is the second threshold or more has continued for a second predetermined time.

20 Claims, 5 Drawing Sheets

(51) Int. Cl.
  *F01N 3/023*    (2006.01)
  *F01N 3/025*    (2006.01)
  *F01N 3/037*    (2006.01)
  *F01N 3/10*     (2006.01)
  *F01N 9/00*     (2006.01)
  *F02D 41/02*    (2006.01)
  *F02D 41/22*    (2006.01)

(52) U.S. Cl.
  CPC .......... *F01N 9/005* (2013.01); *F01N 2430/06* (2013.01); *F01N 2430/08* (2013.01); *F01N 2550/04* (2013.01); *F01N 2550/05* (2013.01); *F01N 2550/12* (2013.01); *F01N 2900/06* (2013.01); *F01N 2900/1606* (2013.01); *F01N 2900/1611* (2013.01); *F01N 2900/1808* (2013.01)

(56) References Cited

U.S. PATENT DOCUMENTS

| | | | |
|---|---|---|---|
| 2015/0260119 A1* | 9/2015 | Nishizawa | F02D 41/405 60/285 |
| 2017/0158194 A1* | 6/2017 | Leisenring | B60W 30/143 |
| 2019/0178142 A1* | 6/2019 | Maeda | F01N 11/002 |
| 2020/0056520 A1* | 2/2020 | Nishimoto | F01N 3/023 |
| 2022/0082039 A1* | 3/2022 | Ishii | B01D 46/42 |

\* cited by examiner

PARTICLE DEPOSITION AMOUNT ESTIMATION DEVICE AND EXHAUST PURIFICATION SYSTEM

CROSS-REFERENCE TO RELATED APPLICATIONS

This application claims priority under 35 U.S.C. § 119 to JP Application No. 2022-037111 filed Mar. 10, 2022, the entire contents of which are hereby incorporated by reference.

TECHNICAL FIELD

The present invention relates to a particle deposition amount estimation device that estimates a particulate (mainly soot) deposition amount in a particulate filter for an exhaust purification device including the particulate filter and to an exhaust purification system including the particle deposition amount estimation device.

BACKGROUND ART

As an exhaust purification device used for a diesel engine, a combination of a diesel oxidation catalyst (hereinafter DOC) and a diesel particulate filter (hereinafter DPF) has been known. Such an exhaust purification device removes soot in exhaust by the DPF. However, when the amount of soot deposited on the DPF (hereinafter a PM deposition amount) exceeds a predetermined upper threshold limit, a filter regeneration process of combusting and removing the soot deposited on the DPF is performed (for example, Patent Document 1). As a method for estimating the PM deposition amount, a method in which the PM deposition amount is calculated from a pressure difference between before and after the DPF (hereinafter a P method) has been widely used.

PRIOR ART DOCUMENT

Patent Document

Patent Document 1: JP-A-2017-57830

SUMMARY OF INVENTION

Technical Problem

Figure 4A:
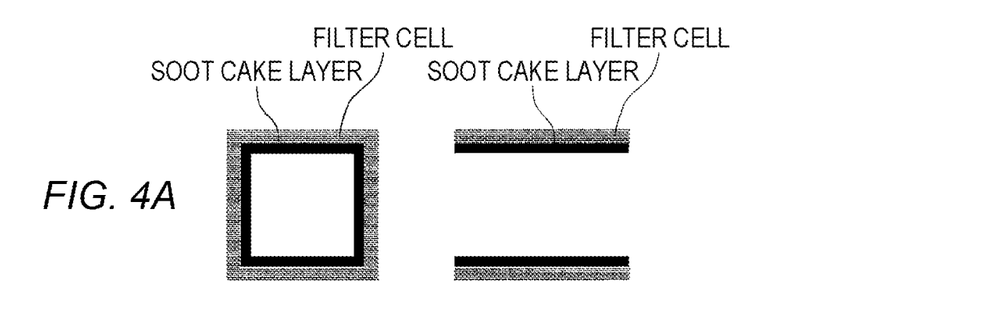
FIGS. 4A to 4D are views for describing the mechanism of occurrence of a soot bridge in a DPF.
Figure 4B:
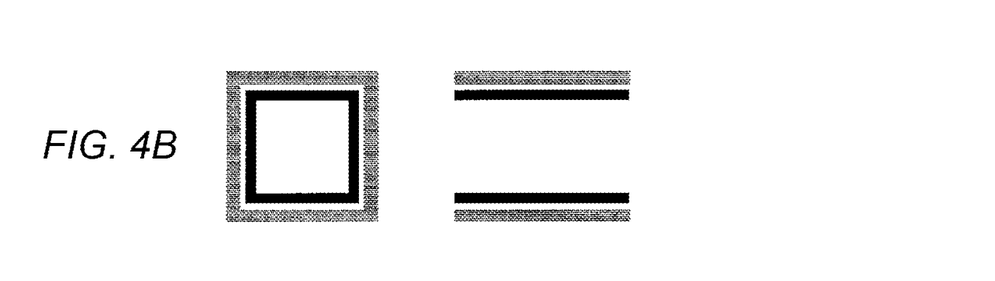
Figure 4C:
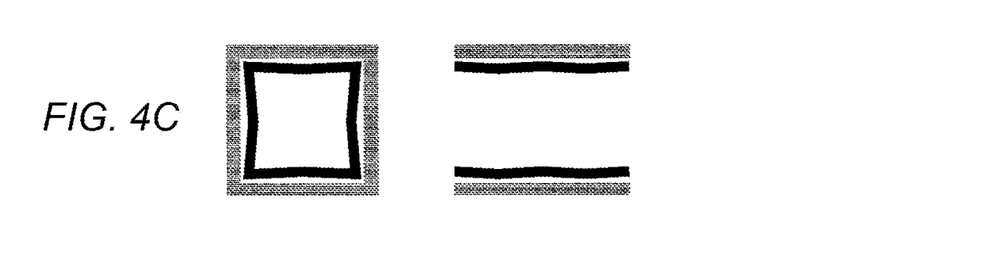
Figure 4D:
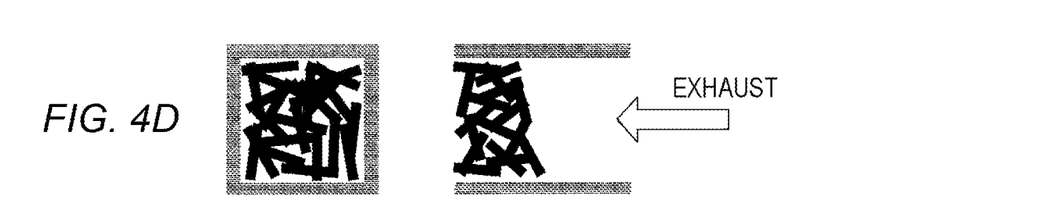

Soot is deposited on the DPF to form a lump thereon, and a phenomenon called a soot bridge sometimes occurs because of the filter being clogged due to crumbling of the soot lump. Conventionally, such a phenomenon called the soot bridge has not been recognized. Specifically, the soot bridge occurs as follows:
(1) soot having entered a filter cell is WALL-deposited, and forms a soot cake layer (see FIG. 4A);
(2) a gap is generated between the filter cell and the soot cake layer due to continuous regeneration of the DPF (assist regeneration control described later) (see FIG. 4B);
(3) the soot cake layer is deformed due to moisture absorption/drying in the soot cake layer (see FIG. 4C), note that moisture absorption in the soot cake layer occurs due to, e.g., the soot cake layer being left for a long time in an engine stop state; and
(4) exhaust is sent into the DPF in a state in which the soot cake layer is deformed, the soot cake layer is crumbled and pushed in by the exhaust, and the filter cell is clogged with the soot cake layer (see FIG. 4D).

Figure 5:
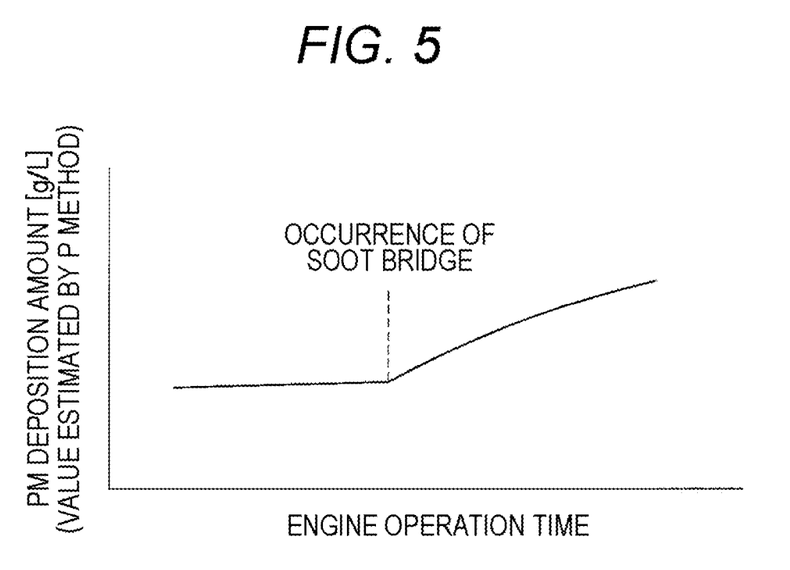
FIG. 5 is a graph showing a change in a PM deposition amount (value estimated by a P method) upon occurrence of the soot bridge.

In a case where the PM deposition amount is estimated by the P method, when the soot bridge occurs in the DPF, the pressure difference between before and after the DPF rapidly increases due to clogging in the filter cell, and accordingly, the estimated value of the PM deposition amount becomes greater than an actual amount (see FIG. 5). In this case, there is a problem that it is difficult to perform an appropriate filter regeneration process based on the PM deposition amount.

The present invention has been made in view of the above-described problem, and is intended to provide an exhaust purification system and an engine capable of performing an appropriate filter regeneration process even if a soot bridge has occurred.

Solution to Problem

In order to solve the above-described problem, a particle deposition amount estimation device according to a first aspect of the present invention isa particle deposition amount estimation device for estimating a particulate deposition amount for an exhaust purification device, that purifies exhaust of an engine using a particulate filter, to determine a regeneration timing for the exhaust purification device based on the estimated amount, the particle deposition amount estimation device employing, as a technique of determining the regeneration timing, a first determination technique of detecting that the estimated amount is a first threshold or more and a state in which the estimated amount is the first threshold or more has continued for a first predetermined time and a second determination technique of detecting that the estimated amount is a second threshold, which is a value greater than the first threshold, or more and a state in which the estimated amount is the second threshold or more has continued for a second predetermined time.

According to the above-described configuration, it is possible to distinguish and determine a state in which no soot bridge has occurred in the particulate filter of the exhaust purification device and a state in which a soot bridge has occurred and to determine the regeneration timing for the engine even if the soot bridge has occurred. That is, if the soot bridge has occurred in the particulate filter, the estimated particulate amount rapidly increases as compared with a case where no soot bridge has occurred, so that the regeneration timing in a state in which the soot bridge has occurred can be determined by the second determination technique while the regeneration timing in a state in which no soot bridge has occurred is determined by the first determination technique.

In the above-described particle deposition amount estimation device, the second predetermined time may be shorter than the first predetermined time.

In the above-described particle deposition amount estimation device, the exhaust purification device may have a pressure detector that detects a pressure difference between before and after the particulate filter, and the estimated amount may be obtained based on the pressure difference between before and after the particulate filter.

In the above-described particle deposition amount estimation device, a time required until the estimated amount reaches the second threshold from the first threshold may be measured, and if the required time is less than a predetermined time, an abnormality in the pressure detector may be detected.

According to the above-described configuration, the abnormality in the pressure detector can be detected using such a characteristic that the estimated amount more rapidly increases upon occurrence of the abnormality in the pressure detector than upon occurrence of the soot bridge.

In the above-described particle deposition amount estimation device, regeneration operation in the engine may include regeneration operation using post-injection in the engine, and the number of times of the regeneration operation using post-injection within a latest predetermined period may be counted, and if the number of times of the regeneration operation exceeds a predetermined number of times, an abnormality in the engine may be detected.

According to the above-described configuration, the engine abnormality can be detected using such a characteristic that the frequency of the regeneration operation using post-injection increases if the engine abnormality such as an injector abnormality has occurred.

In order to solve the above-described problem, an exhaust purification system according to a second aspect of the present invention includes an exhaust purification device that purifies exhaust of an engine by an oxidation catalyst and a particulate filter, and the particle deposition amount estimation device described above.

Advantageous Effects of Invention

The particle deposition amount estimation device and the exhaust purification system of the present invention employ the two types of determination techniques different from each other in the determination threshold and the determination time for the estimated amount of particulate deposited on the particulate filter, so that the state in which no soot bridge has occurred in the particulate filter and the state in which the soot bridge has occurred can be distinguished and determined and an effect of an appropriate filter regeneration process being able to be performed even if the soot bridge has occurred can be obtained.

DESCRIPTION OF EMBODIMENTS

Figure 1:
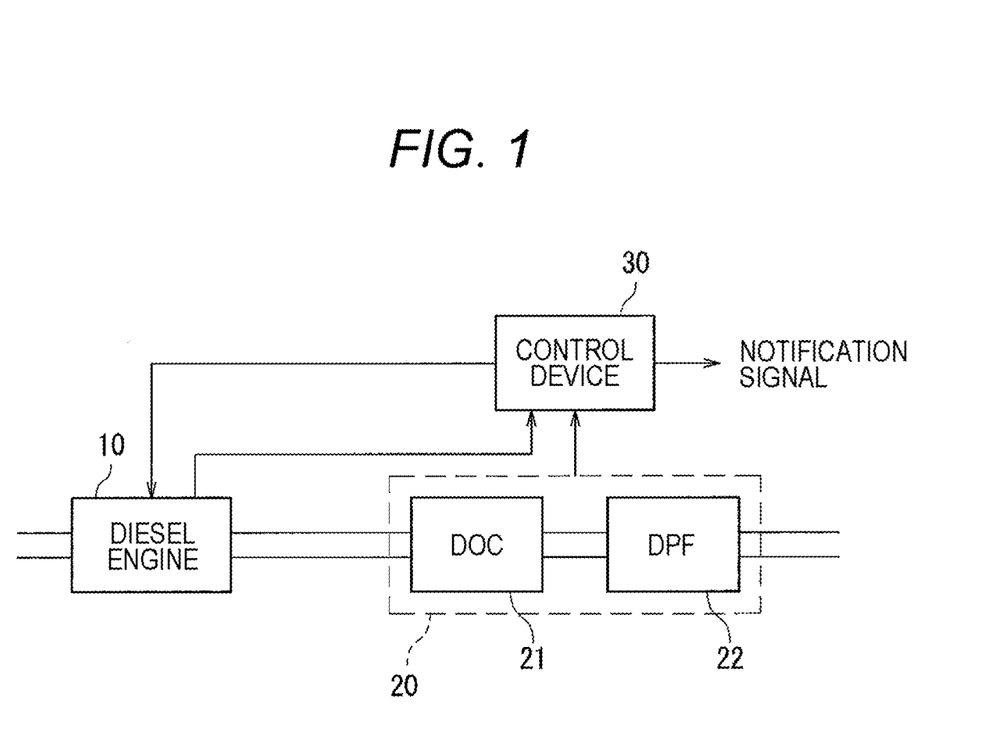
FIG. 1 is a block diagram showing a schematic configuration of an engine system, to which the present invention is applicable, in one embodiment of the present invention.

Hereinafter, an embodiment of the present invention will be described in detail with reference to the drawings. FIG. 1 is a block diagram showing a schematic configuration of an engine system (hereinafter, a present system) to which the present invention is applicable. As shown in FIG. 1, the present system includes a diesel engine 10, an exhaust purification device 20, and a control device 30. Note that in the present system, the control device 30 corresponds to a particle deposition amount estimation device of the present invention, and the exhaust purification device 20 and the control device 30 correspond to an exhaust purification system of the present invention. The exhaust purification device 20 collects particulates from exhaust of the diesel engine 10 to purify the exhaust. Here, the particulates to be collected are soot.

The exhaust purification device 20 is disposed in an exhaust system (exhaust path) of the diesel engine 10, and includes a DOC 21 and a DPF 22. Of the DOC 21 and the DPF 22, the DOC 21 is disposed on the upstream side in an exhaust flow direction, and the DPF 22 is disposed on the downstream side in the exhaust flow direction. The control device 30 monitors the status of the exhaust purification device 20, and according to this status, causes the present system to perform a filter regeneration process (hereinafter regeneration operation) at an appropriate regeneration timing. That is, the control device 30 estimates a PM deposition amount (soot deposition amount) in the DPF 22, and causes the diesel engine 10 to perform the regeneration operation based on the estimated PM deposition amount (estimated amount). The status of the exhaust purification device 20 is monitored by the control device 30 based on, e.g., an output signal from a sensor provided for the diesel engine 10 or the exhaust purification device 20, but the sensor is not shown in FIG. 1.

First, the regeneration operation performed in the present system will be described. For the present system, four types of regeneration operation, i.e., assist regeneration control, reset regeneration control, stationary regeneration control, and recovery regeneration control, are prepared as the regeneration operation.

(1) Assist Regeneration Control

The assist regeneration control is performed at a timing when the PM deposition amount reaches a predetermined value or more.

A temperature in the exhaust purification device 20 is relatively low (about 300 to 400° C.).

At this temperature, $NO_2$ is generated by catalytic reaction in the DOC 21, and soot deposited in the DPF 22 is oxidized and removed by $NO_2$ ($NO_2$ regeneration).

The temperature of the exhaust purification device 20 is controlled by using an intake throttle and performing after-injection (post-injection is not performed).

This process can be performed during an engine work. The engine work means that drive force is transmitted from the diesel engine 10 to a load (for example, a generator driven by the engine.) to cause the load to perform a work.

(2) Reset Regeneration Control

The reset regeneration control is performed in every predetermined time (for example, several tens to several hundreds of hours).

This control is performed in a case where the PM deposition amount does not sufficiently decrease even if the assist regeneration control is performed.

The temperature in the exhaust purification device 20 is relatively high (about 500 to 700° C.).

At this temperature, $NO_2$ is not generated in the DOC 21, and soot deposited in the DPF 22 is oxidized and removed by $O_2$ ($O_2$ regeneration).

The temperature of the exhaust purification device 20 is controlled in such a manner that an exhaust temperature is increased by using the intake throttle and performing after-injection and post-injection.

This process can be performed during an engine work.

(3) Stationary Regeneration Control

The stationary regeneration control is performed in a case where the PM deposition amount does not sufficiently decrease even if the reset regeneration control is performed.

As in the reset regeneration control, the temperature in the exhaust purification device 20 is relatively high (about 500 to 700° C.), and soot deposited in the DPF 22 is oxidized and removed by $O_2$ regeneration.

As in the reset regeneration control, the exhaust temperature is increased by using the intake throttle and performing after-injection and post-injection.

An engine rotation speed is maintained at a predetermined high rotation speed so that soot can be removed from the DPF 22 under more favorable conditions than those in the reset regeneration control.

This process cannot be performed during the engine work. That is, the drive force of the diesel engine 10 is not transmitted to the load during the stationary regeneration control.

(4) Recovery Regeneration Control

The recovery regeneration control is performed in a case where the PM deposition amount does not sufficiently decrease even if the reset regeneration control is performed.

This control is performed in a state in which soot is excessively deposited in the DPF 22, and is performed at a temperature lower than that in the stationary regeneration control in order to avoid, e.g., abrupt combustion of soot.

Other points are the same as those in the stationary regeneration control.

Figure 2:
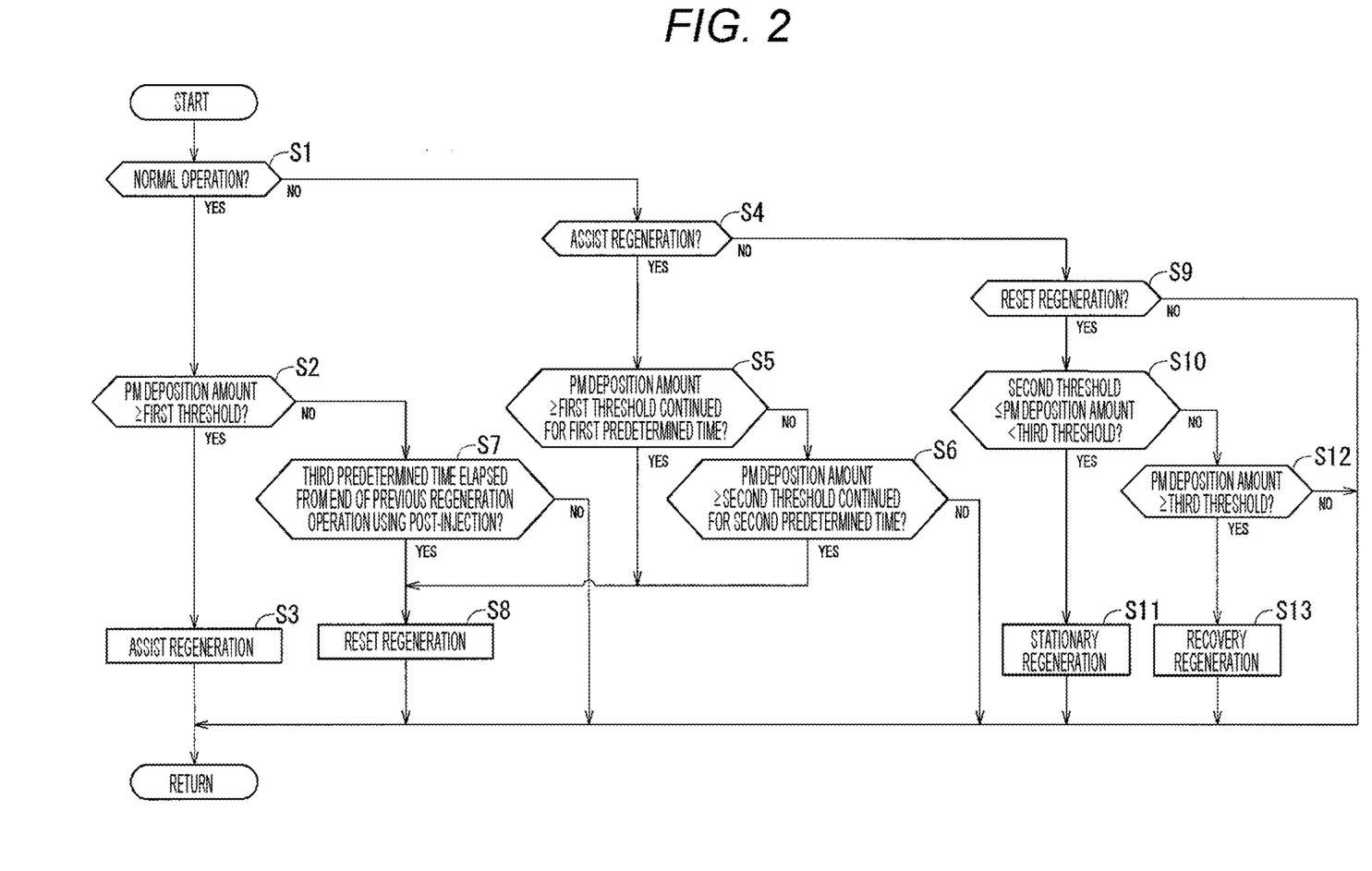
FIG. 2 is a flowchart showing operation mode switching control.
Figure 3:
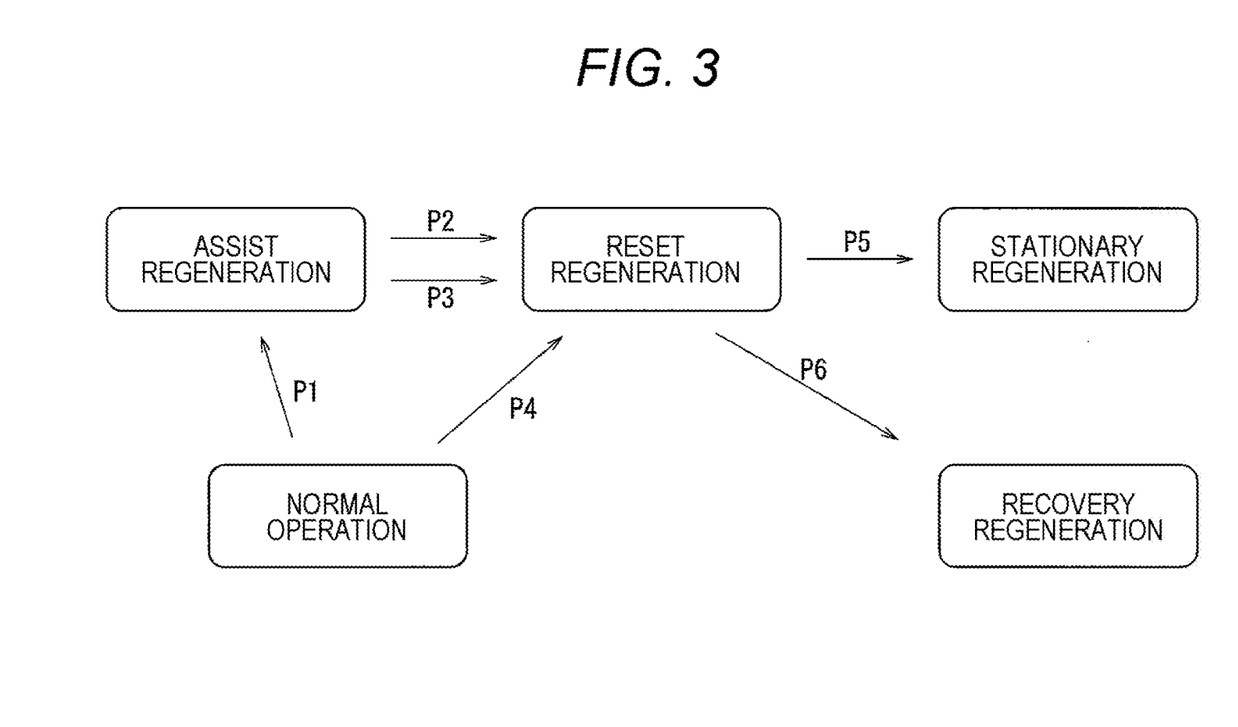
FIG. 3 is an operation mode transition diagram in the switching control of FIG. 2.

Next, operation mode switching control in the present system, i.e., a control of switching an operation mode among normal operation and the above-described four types of regeneration operation will be described. FIG. 2 is a flowchart showing the operation mode switching control. FIG. 3 is a transition diagram showing the flow of transition of the operation mode by the switching control.

First, in this switching control, it is determined whether or not the current operation mode of the present system is the normal operation (S1). If the current operation mode is the normal operation (YES in S1), it is determined whether or not a condition for transition to the assist regeneration control is satisfied (S2). Specifically, if the PM deposition amount is a first threshold or more (YES in S2), the condition for transition to the assist regeneration control is satisfied, and transition from the normal operation to the assist regeneration control (a flow P1 in FIG. 3) is made (S3). Note that the present system is based on the assumption that the above-described P method is used for estimating the PM deposition amount and the PM deposition amount used for determination in this flow is a value estimated by the P method. The first threshold used for determination in S2 is the upper threshold limit for the normal operation.

If NO in S1, it is determined whether or not the current operation mode is the assist regeneration control (S4). If the current operation mode is the assist regeneration control (YES in S4), it is determined whether or not a condition for transition to the reset regeneration control is satisfied (S5, S6).

Specifically, if a state in which the PM deposition amount is the first threshold or more has continued for a first predetermined time (YES in S5), the condition for transition to the reset regeneration control is satisfied, and transition from the assist regeneration control to the reset regeneration control (a flow P2 in FIG. 3) is made (S8). Even in the case of NO in S5, if a state in which the PM deposition amount is a second threshold or more has continued for a second predetermined time (YES in S6), the condition for transition to the reset regeneration control is satisfied, and transition from the assist regeneration control to the reset regeneration control (a flow P3 in FIG. 3) is made (S8).

Here, the second threshold is set to a value greater than the first threshold. The second predetermined time is set to be shorter than the first predetermined time. On this point, the second predetermined time is preferably set to be significantly shorter than the first predetermined time. For example, the first predetermined time is preferably set on the order of minutes, and the second predetermined time is preferably set on the order of seconds. Note that in the present system, determination in S5 for making transition in the flow P2 corresponds to a first determination technique described in the claims, and determination in S6 for making transition in the flow P3 corresponds to a second determination technique described in the claims.

If NO in both S5 and S6, i.e., if the assist regeneration controls has ended without transitioning to the reset regeneration control, this flow returns. Note that although not described in detail with reference to FIGS. 2 and 3, if the PM deposition amount reaches the lower threshold limit (<upper threshold limit) for the normal operation by execution of the assist regeneration control, the assist regeneration control ends and transitions to the normal operation.

In some cases, the assist regeneration control does not transition to the reset regeneration control, but the normal operation transitions to the reset regeneration control. That is, even in the case of NO in S2, if a third predetermined time has elapsed from the end of the previous regeneration operation (reset regeneration control, stationary regeneration control, or recovery regeneration control) using post-injection, transition from the normal operation to the reset regeneration control (a flow P4 in FIG. 3) is made (S8). Here, the third predetermined time is set to be longer (several tens to several hundreds of hours) than the second predetermined time. If NO in S7, this flow returns.

If NO in S4, it is determined whether or not the current operation mode is the reset regeneration control (S9). If the current operation mode is the reset regeneration control (YES in S9), it is determined whether or not a condition for transition to the stationary regeneration control (S10) or a condition for transition to the recovery regeneration control is satisfied (S12).

Specifically, if the PM deposition amount is the second threshold or more and less than a third threshold (YES in S10), the condition for transition to the stationary regeneration control is satisfied, and transition from the reset regeneration control to the stationary regeneration control (a flow P5 in FIG. 3) is made (S11). If the PM deposition amount is the third threshold or more (NO in S10, YES in S12), the condition for transition to the recovery regeneration control is satisfied, and transition from the reset regeneration control to the recovery regeneration control (a flow P6 in FIG. 3) is made (S3). Here, the third threshold is set to a value greater than the second threshold. If NO in S12, this flow returns.

Note that if the PM deposition amount does not decrease even after the recovery regeneration control has been performed and exceeds a fourth threshold (>the third threshold), further execution of the recovery regeneration control is inhibited so that the diesel engine 10 can be stopped.

The feature of the operation mode switching control in the present system is that not only the flow P2 but also the flow P3 are provided for transition from the assist regeneration control to the reset regeneration control. Conventionally, transition from the assist regeneration control to the reset regeneration control is made only in the flow P2. Also, conventionally, the flow of transition from the assist regeneration control to the stationary regeneration control or the recovery regeneration control is provided. In the conventional control, in a case where a soot bridge has occurred in the DPF 22, there is a problem that transition from the assist regeneration control to the stationary regeneration control or the recovery regeneration control is frequently made, i.e., the engine work frequently stops.

On the other hand, in the control of the present system, in a case where the soot bridge has occurred in the DPF 22, transition from the assist regeneration control to the reset regeneration control can be made by transition in the flow P3. That is, since the PM deposition amount estimated by the P method rapidly increases in a short time due to the soot bridge, the PM deposition amount is determined under the condition of the flow P3 so that rapid transition to the reset regeneration control can be made and the soot bridge can be eliminated promptly. As a result, the frequency of transition to the stationary regeneration control or the recovery regeneration control, which leads to stop of the engine work, can be reduced.

In addition, in the control of the present system described above, an abnormal value of the PM deposition amount due to the soot bridge is detected, and if detected, the assist regeneration control can transition to the reset regeneration control. Note that the abnormal value of the PM deposition amount may be caused due to a factor other than the soot bridge. For example, the PM deposition amount estimated by the P method also rapidly increases in a case where there is an abnormality in a pressure detector (e.g., a pressure sensor) that detects the inlet or outlet pressure of the DPF 22.

Such an abnormality in the pressure detector can be detected, for example, by the following method. That is, a time required until the PM deposition amount reaches the second threshold from the first threshold is measured, and if the required time is less than a predetermined time, it is determined that the PM deposition amount has rapidly increased and the abnormality in the pressure detector is detected accordingly. Note that the predetermined time is preferably set to be longer than the first predetermined time and shorter than the second predetermined time. For example, the predetermined time is preferably set on the order of minutes.

In a case where the control flow of FIG. 2 includes determining the abnormality in the pressure detector, determination on whether or not the required time from the first threshold to the second threshold is less than the predetermined time may be made after determination as YES in S6. In such determination, if the time required until the PM deposition amount reaches the second threshold from the first threshold is the predetermined time or more, it is determined that the soot bridge has occurred instead of the abnormality in the pressure detector, whereby occurrence of the soot bridge and the abnormality in the pressure detector can be distinguished from each other.

In the present system, an abnormality (for example, an injector abnormality) in the diesel engine 10 can also be detected. If the engine abnormality such as the injector abnormality has occurred, the frequency of the regeneration operation (reset regeneration control, stationary regeneration control, or recovery regeneration control) using post-injection may increase. In other words, it can be said that if the frequency of the regeneration operation using post-injection increases, the probability of the engine abnormality is high. Thus, the engine abnormality can be detected based on the frequency of the regeneration operation using post-injection.

Specifically, the engine abnormality can be detected in the following manner: the number of times of the regeneration operation using post-injection within a latest predetermined period is counted, and if the number of times of the regeneration operation exceeds a predetermined number of times, it is determined that the engine abnormality has occurred. Note that for the abnormalities in the pressure detector and the engine, replacement of a component such as a sensor or an injector is often required. For this reason, if these abnormalities have been detected, the control device 30 can output a notification signal (see FIG. 1) to a notification unit (e.g., a display or a speaker) to urge a user to take action such as component replacement.

The embodiment disclosed herein is illustrative in all respects, and does not provide a basis for limited interpretation. Thus, the technical scope of the present invention is not interpreted only based on the above-described embodiment, but is defined based on description of the claims. In addition, meanings equivalent to those in the claims and all modifications within the scope of the claims are included.

For example, in description above, the PM deposition amount is the value estimated by the P method, but another method may be used in combination for estimating the PM deposition amount. For example, as the method for estimating the PM deposition amount, a method in which the soot deposition amount is calculated based on chemical reaction in the DOC 21 and the DPF 22 (hereinafter, a C method) is also known, and the P method and the C method may be used in combination in the present system. In a case where the P method and the C method are used in combination, in each determination step of the control flow of FIG. 2, it may only be required that it is determined as YES if any of the values estimated by the P method and the C method satisfies the determination condition. The C method has a higher determination accuracy than that of the P method in a normal state, and the PM deposition amount can be estimated with a high accuracy by use of the C method in combination.

Note that since the value estimated by the C method is not influenced by the soot bridge, occurrence of the soot bridge is not determined as YES in S6 in the control flow of FIG. 2 if only the C method is used. On this point, if the P method and the C method are used in combination, occurrence of the soot bridge is determined as YES in S6 depending on the value estimated by the P method.

LIST OF REFERENCE SIGNS

10 Diesel Engine
20 Exhaust Purification Device (Exhaust Purification System)
21 DOC (Oxidation Catalyst)
22 DPF (Particulate Filter)
30 Control Device (Particle Deposition Amount Estimation Device, Exhaust Purification System)

The invention claimed is:

1. A particle deposition amount estimation device for estimating a particulate deposition amount for an exhaust purification device that is configured to purify exhaust of an engine using a particulate filter, to determine a regeneration timing for the exhaust purification device based on the estimated amount, the particle deposition amount estimation device employing, as a technique of determining the regeneration timing:

a first determination technique of detecting that the estimated amount is a first threshold or more and a state in which the estimated amount is the first threshold or more has continued for a first predetermined time; and a second determination technique of detecting that the estimated amount is a second threshold, which is a value greater than the first threshold, or more and a state in which the estimated amount is the second threshold or more has continued for a second predetermined time.

2. The particle deposition amount estimation device according to claim 1, wherein the second predetermined time is shorter than the first predetermined time.

3. The particle deposition amount estimation device according to claim 1, wherein:
the exhaust purification device has a pressure detector configured to detect a pressure difference between before and after the particulate filter, and
the estimated amount is obtained based on the pressure difference between before and after the particulate filter.

4. The particle deposition amount estimation device according to claim 3, further employing, as a technique of determining the regeneration timing:
a third determination technique that includes measuring a time required until the estimated amount reaches the second threshold from the first threshold and detecting an abnormality in the pressure detector based on the required time being less than a third predetermined time.

5. The particle deposition amount estimation device according to claim 1, wherein:
regeneration operation in the engine includes regeneration operation using post-injection in the engine, and
the number of times of the regeneration operation using the post-injection within a latest predetermined period is counted, and if the number of times of the regeneration operation exceeds a predetermined number of times, an abnormality in the engine is detected.

6. An exhaust purification system comprising:
an exhaust purification device configured to purify exhaust of an engine by an oxidation catalyst and a particulate filter; and
the particle deposition amount estimation device according to claim 1.

7. The particle deposition amount estimation device according to claim 1, wherein:
the first determination technique includes controlling the engine to transition from a first regeneration operation to a second regeneration operation in response to detecting that the estimated amount is the first threshold or more and the state in which the estimated amount is the first threshold or more has continued for the first predetermined time.

8. The particle deposition amount estimation device according to claim 1, wherein:
the second determination technique includes controlling the engine to transition from a first regeneration operation to a second regeneration operation in response to detecting that the estimated amount is the second threshold or more and the state in which the estimated amount is the second threshold or more has continued for the second predetermined time.

9. The particle deposition amount estimation device according to claim 1, wherein the state in which the estimated amount is the second threshold or more having continued for the second predetermined time is indicative of a soot bridge occurring in the particulate filter.

10. The particle deposition amount estimation device according to claim 1, wherein the first predetermined time is at least twice as long as the second predetermined time.

11. An apparatus comprising:
a memory storing processor-executable code; and
a processor in communication with the memory, the processor configured to execute the processor-executable code so as to perform operations that determine a regeneration timing of a particulate filter of an engine, the operations including:
determining whether an estimated particulate deposition amount on the particulate filter is greater than or equal to a first threshold amount for a first predetermined amount of time; and
determining whether the estimated particulate deposition amount on the particulate filter is greater than or equal to a second threshold amount for a second predetermined amount of time, wherein the second threshold amount is greater than the first threshold amount.

12. The apparatus according to claim 11, the operations including:
determining that the estimated particulate deposition amount on the particulate filter is greater than or equal to the first threshold amount for the first predetermined amount of time; and
based on a determination that the estimated particulate deposition amount on the particulate filter is greater than or equal to the first threshold amount for the first predetermined amount of time, controlling the engine to transition from a first regeneration operation to a second regeneration operation.

13. The apparatus according to claim 11, the operations including:
determining that the estimated particulate deposition amount on the particulate is less than the first threshold amount for the first predetermined amount of time; and
determining that the estimated particulate deposition amount on the particulate filter is greater than or equal to the second threshold amount for the second predetermined amount of time.

14. The apparatus according to claim 13, the operations including:
based on a determination that the estimated particulate deposition amount on the particulate filter is greater than or equal to the second threshold amount for the second predetermined amount of time, controlling the engine to transition from a first regeneration operation to a second regeneration operation.

15. A method of determining a regeneration timing of a particulate filter included in an engine, the method comprising:
determining, based on at least one sensor signal, that an estimated particulate deposition amount on the particulate filter has failed to meet a first threshold amount for a first predetermined amount of time;
determining, based on the at least one sensor signal, that the estimated particulate deposition amount on the particulate filter has met a second threshold amount for a second predetermined amount of time, wherein the second threshold amount is greater than the first threshold amount; and
controlling the engine, based on the estimated particulate deposition amount on the particulate filter meeting the second threshold amount for the second predetermined amount of time, to transition from a first regeneration operation to a second regeneration operation.

16. The method according to claim 15, wherein the first regeneration operation is an assist regeneration operation and the second regeneration operation is a reset regeneration operation.

17. The method according to claim 16, wherein:
the assist regeneration operation includes an $NO_2$ regeneration operation; and
the reset regeneration operation includes an $O_2$ regeneration operation.

18. The method according to claim 15, wherein determining that the estimated particulate deposition amount on the particulate filter is less than the first threshold amount for the first predetermined amount of time is indicative of the particulate filter being free from a soot bridge.

19. The method according to claim 15, the first predetermined amount of time is at least twice as long as the second predetermined amount of time.

20. The method according to claim 15, comprising:
determining an amount of time for the estimated amount to reach the second threshold from the first threshold; and
detecting an abnormality in a pressure detector of the engine based on the amount of time being less than a third predetermined amount of time.

* * * * *